Patented Mar. 12, 1935

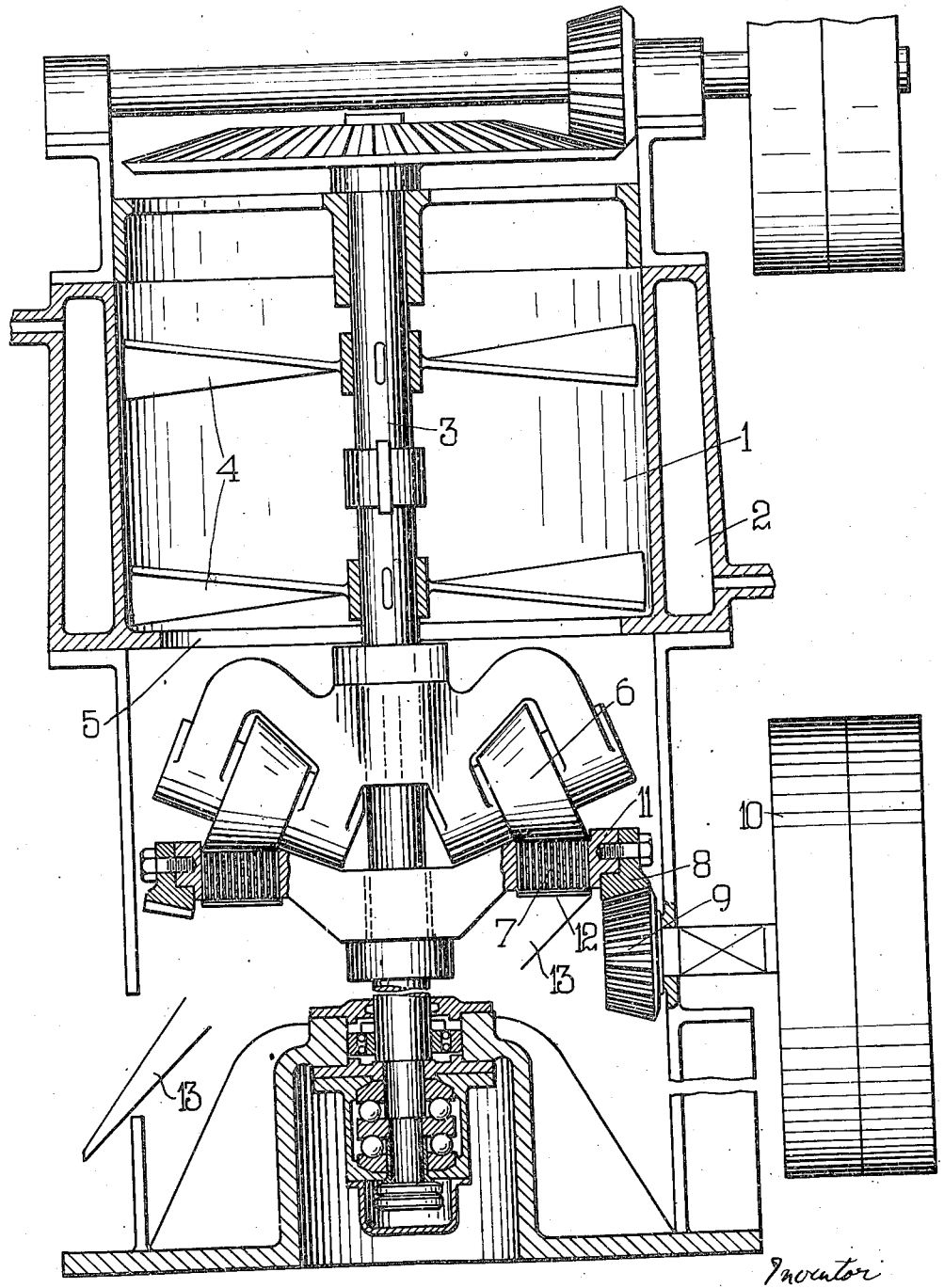

1,994,371

UNITED STATES PATENT OFFICE 1,994,371

MOLDING MACHINE

Albert William Sizer, Hessle, Kingston-upon-Hull, England

Application August 14, 1933, Serial No. 685,117

1 Claim. (Cl. 107—8)

The present invention relates to improvements in molding machines for plastic substances and is particularly useful in the molding of cakes, cubes or pellets suitable for the feeding of poultry and animals generally, made from meal or meal mixtures.

According to the present invention, material to be molded is fed to the space between conical rollers rotating about their own axes and a revolving perforated disc or die plate.

The invention is more particularly described with reference to the accompanying drawing, in which:—

Figure 1 is a front elevation of one form of machine.

The machine comprises a vessel 1 preferably provided with a heating jacket 2 as shown, in which material such as meal or mixtures of meal to be molded into pellets can be cooked. A shaft 3 passes through the cooking vessel 1 and is provided with stirrer blades 4 stirring and feeding the material within the cooker 1, which material passes through a hole in the base 5 of the vessel to come in the space between pairs of rolls 6 which preferably are conical as shown, their axes of rotation intersecting the central axis of the shaft 3 on the contacting surface of said rolls and die plate 7.

The die plate 7 is independently driven of the rollers 6 by means of a toothed ring 8 having bevelled teeth on it and driven by a bevel wheel 9 and counter-shaft and pulleys 10.

It will be noticed that the die plate 7 is recessed to leave an upstanding flange 11, so that meal fed between the rollers and the die plate 7 does not tend to escape radially outwards.

The cakes, cubes, or pellets are stripped by means of a fixed blade or doctor 12, and fall down a chute or delivery tray 13.

It is to be understood that by rotating the cage which supports the rollers in a direction opposite to that of the die plate, a high relative speed between the die plate and the rollers may be obtained so that a more efficient and rapid extrusion of the material may be thus afforded.

I declare that what I claim is:—

A molding machine comprising in combination a perforated die plate, means to rotate said die plate, conical rolls co-operating with said die plate, a cage supporting said rolls, a driving shaft for said cage, a cooking kettle above said rolls, stirrer blades therein and mounted on said shaft connected to said cage and means to rotate said shaft independently of said die plate.

ALBERT WILLIAM SIZER.